United States Patent [19]

Wagner

[11] 4,213,865
[45] Jul. 22, 1980

[54] APPARATUS FOR SEPARATING SLUDGE, OIL AND THE LIKE FROM CONTAMINATED WATER

[75] Inventor: Karl Wagner, Houston, Tex.

[73] Assignee: Fabrication Unlimited, Inc., Houston, Tex.

[21] Appl. No.: 927,141

[22] Filed: Jul. 21, 1978

[51] Int. Cl.² .............................................. B01D 21/10
[52] U.S. Cl. .................................................. 210/522
[58] Field of Search ................................ 210/521, 522

[56] References Cited

U.S. PATENT DOCUMENTS

| | | | |
|---|---|---|---|
| 3,666,111 | 5/1972 | Pielkenrood et al. | 210/521 |
| 3,666,112 | 5/1972 | Pielkenrood et al. | 210/521 |
| 3,849,311 | 11/1974 | Jakubek | 210/521 X |
| 4,056,477 | 11/1977 | Ravitts | 210/522 |
| 4,067,813 | 1/1978 | Pielkenrood | 210/521 X |
| 4,138,342 | 2/1979 | Middelbeek et al. | 210/522 |

Primary Examiner—William A. Cuchlinski, Jr.
Attorney, Agent, or Firm—Guy E. Matthews

[57] ABSTRACT

Apparatus is disclosed for separating sludge, oil and the like from contaminated water having walls separating a tank into first and second compartments. The tank has an inlet for carrying the contaminated water thereto, a first outlet for removing separated oil and the like, a second outlet for removing the treated water and an outlet for removing separated sludge and the like. A plate pack is mounted on an inclined wall within the tank with the pack sloping downwardly from a first to a second end. The improved pack includes side walls, a top and a bottom forming a conduit for carrying the contaminated water from the first to the second end. A plurality of plates is mounted one above the other extending between the side walls to provide a plurality of passageways. The plate pack second end defines a substantially vertical plane when the pack is mounted on the inclined wall. The contaminated water passes from the first to the second compartment by flowing down through the passageways and the oil separates from the water during such passage to rise and flow out the first end and the sludge separates from the water to settle and flow out the second end.

4 Claims, 3 Drawing Figures

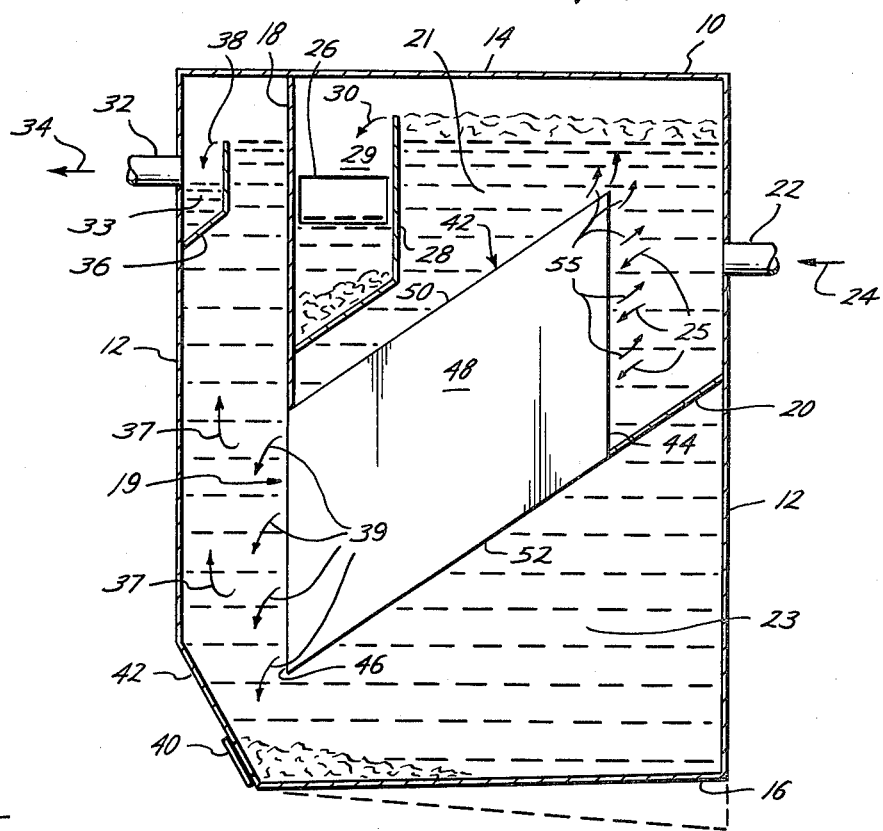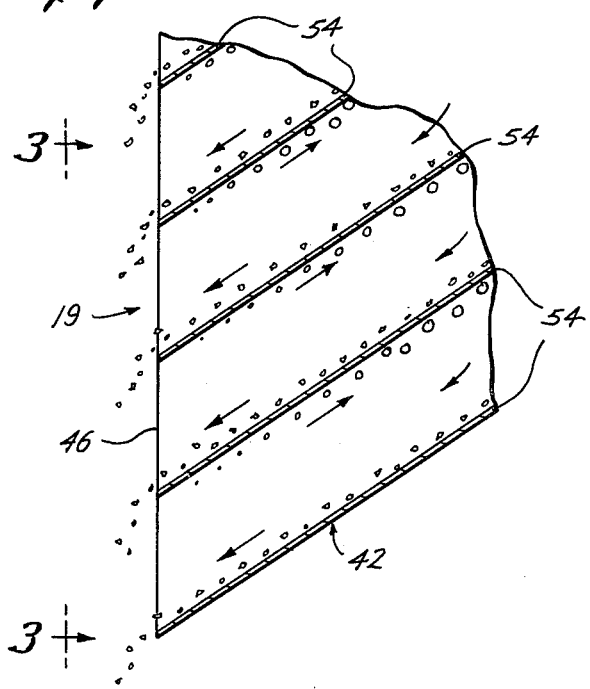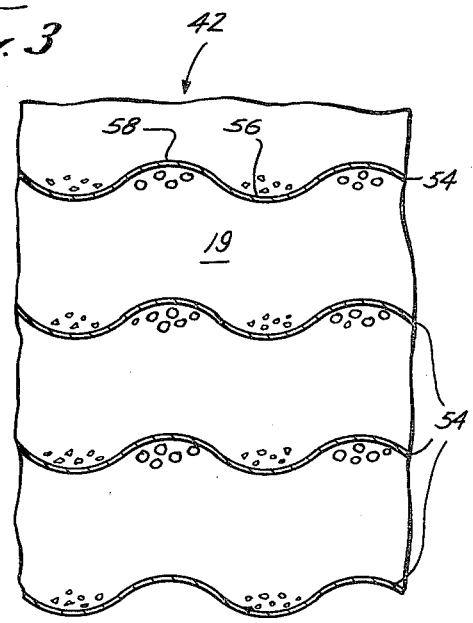

APPARATUS FOR SEPARATING SLUDGE, OIL AND THE LIKE FROM CONTAMINATED WATER

BACKGROUND AND BRIEF SUMMARY OF THE INVENTION

The desirability of separating sludge, oil and the like from contaminated water is well known.

One device that has been suggested for such continuous separation uses a process tank to channel the contaminated water through a corrugated plate pack. The corrugated plate pack has a plurality of corrugated plates mounted one above the other with the water flowing between the plates from a first compartment to a second compartment formed within the tank. Such passage permits the oil and the like (light components of the contaminated water) to flow upwardly and back into the first compartment, while the sludge and the like (the heavy components of the contaminated water) settle out of the water and into the second compartment. A major difficulty with such prior art plate packs has been that the sludge and the like stick within and clog the passageways formed by the plurality of plates and thereby adversely affect the pack's operating efficiency.

Accordingly, it is a primary aim of the present invention to provide an apparatus which considerably reduces clogging of the passageways fromed in a plate pack separator, thereby improving its efficiency.

In accordance with the invention, an apparatus is provided for use in a process tank for separating sludge, oil and the like from contaminated water. The process tank includes walls separating the tank into first and second compartments, one of the walls having an opening therein to permit passage of the contaminated water therethrough and another of the walls being mounted at an incline to the horizon. The apparatus also includes an inlet mounted with the tank for carrying contaminated water into the first compartment, a first outlet mounted with the tank for removing oil and the like separated from the contaminated water from the first compartment, a second outlet mounted with the tank for removing sludge and the like separated from the contaminated water from the second compartment. Further, the apparatus includes a plate pack mounted with the inclined wall in said tank, having side walls, a top and a bottom to form a conduit for carrying the contaminated water from a first to a second end. The plates are mounted one above the other and extend between the side walls to provide a plurality of passageways. The plates are sufficiently displaced from one another to permit laminar flow of the water through the passageways and permit the water to pass from the first to the second compartment by flowing downwardly through the passageways. Oil and the like is separated from the water during such passage and rises to flow out the first end, while sludge and the like separates from the water during such passage to settle and flow out the second end. The ends of the plates are disposed in the second end of the conduit to form an essentially vertical plane when the pack is mounted on the inclined wall. This substantially reduces clogging of the passageways during separation of the sludge from the water when flowing through the pack.

Also, in accordance with the invention, an improved plate pack used to separate sludge, oil and the like from contaminated water is disclosed. This pack includes a conduit for carrying the contaminated water from a first to a second end, the conduit having side walls, a top and a bottom. The pack further includes a plurality of plates mounted within said conduit one above the other to provide a plurality of passageways, the plates being sufficiently displaced from one another to permit laminar flow of the contaminated water through the passageways. Each plate contains axial corrugations along the length of the conduit. The pack is disposed at an angle relative to the tank bottom so that contaminants in the liquid may exit the pack conduit under force of gravity.

BRIEF DESCRIPTION OF THE DRAWINGS

Other objects and advantages of the invention will become apparent upon reading the following detailed description and upon reference to the drawings, in which like reference numerals are used throughout to indicate like elements:

FIG. 1 is a side view of an exemplary embodiment of apparatus constructed according to the present invention.

FIG. 2 is a vertical side sectional view of the corrugated plate pack.

FIG. 3 is an end view taken in the direction of arrows 3—3 of that portion of the invention shown in FIG. 2.

While the invention will be described in connection with a preferred embodiment, it will be understood that it is not intended to limit the invention to that embodiment. On the contrary, it is intended to cover all alternatives, modification and equivalents as may be included within the spirit and scope of the invention as defined by the appended claims.

DETAILED DESCRIPTION OF THE INVENTION

Turning now to the drawings, there is shown an apparatus for separating sludge, oil and like from contaminated water. This apparatus includes a process tank 10, defined by side walls 12, top 14 and bottom 16. Provided within process tank 10 are separating walls 18 and 20, dividing the tank into first and second compartments 21 and 23, respectively. Wall 18 is preferably vertical and has an opening 19 therein permitting passage of the contaminated water from the first to the second compartment. Separating wall 20 is mounted in the tank 10 at an incline. In the preferred embodiment, this angle of incline is approximately 45° from horizontal.

An inlet 22 is mounted with side wall 12 of tank 10 for carrying contaminated water into the first compartment 21 as indicated by arrow 24. The contaminated water flows into a plate pack 42, as shown by arrows 25, for passage therethrough from a first end 44 to a second end 46. Preferably, inlet 22 is a conduit which discharges the contaminated water into the first compartment 21 of tank 10 at a position below the uppermost part of first end 44 of pack 42.

A first outlet 26 is mounted with tank 10, preferably on side wall 12, for removing separated oil and the like from the first compartment 21. It is further preferred that outlet 26 be mounted to tank 10 for communication with a first separating compartment 29, formed within tank 10 by separating walls 28 and side wall 12. Thus, oil and the like contained in the incoming contaminated water, being less dense, will rise to the top and float where it will flow over the top edge of wall 28, as shown by arrow 30. Inside this first separating compartment 29, the water and oil mixture is considerably less turbulent, which permits the less dense oil to rise to the top a second time and exit the first outlet 26, providing a second separating stage for the oil/water mixture.

A plate pack 52 is mounted in inclined wall 20 in tank 10 to slope downwardly from a first end 44 toward second end 46. Plate pack 42 has side walls 48, a top 50 and a bottom 52 to form a conduit for carrying the contaminated water therethrough from the first to the second end. Second end 46 is mounted near the opening 19 through the wall 18 and discharges the treated water and sludge into the second compartment 23.

Plate pack 42 includes a plurality of plates 54 mounted one above the other between side walls 48 to provide a plurality of passageways between the first and second compartments. Plates 54 are displaced from one another sufficiently to permit laminar flow of the water through the formed passageways and preferably include corrugations 56 and 58 extending from first end 44 to second end 46. The water thus passes from the first to the second compartment by flowing downwardly through these passageways. Inside these passageways, oil and the like rises toward the above plate 54, causing small droplets of oil to collect and form larger oil droplets and flow out first end 44 back into the first compartment 23, as shown by arrows 55 in FIG. 1. Sludge and the like settles from the water during such passage to flow out the second end into the second compartment 23, as shown by arrows 39.

The end of plate 54 disposed in second end 46 of the conduit formed by sidewalls 48, top 50 and bottom 52 of pack 42 forms a plane, lying substantially vertical when pack 42 is mounted on inclined wall 20. It has been found that this arrangement considerably reduces clogging of the passageways by the sludge during separation of the sludge from the water when flowing through pack 42. It has further been found that this plane should be within approximately 5° of vertical. Further, it is preferred that both ends of plates 54 disposed in first end 44 and second end 46 of pack 42 form planes which lie substantially parallel to one another and each plane should be within 5° of vertical for maximum efficiency of operation.

A second outlet 32 is mounted with tank 10 for removing the treated water from the second compartment 23, as represented by arrow 34. Preferably, outlet 32 is mounted on side wall 12 of tank 10 for communication with the second separating compartment 23. Baffle wall 36 is mounted to the inside of side wall 12 and further divides the second compartment 23. Treated water flows over the top of wall 36, as shown by arrow 38, into a third compartment 33, where it settles and exits the process tank 10, as shown by arrow 34, for return to service.

A third outlet 40 is mounted with tank 10 for removing sludge and the like from the second compartment 23 as the sludge settles toward bottom 16, as shown by arrows 39. Outlet 40 may be disposed in an inclined side wall 42 of tank 10 or when bottom 16 extends downwardly from the horizontal, as shown by dotted outline in FIG. 1, the sludge may be removed through an outlet disposed in the right-hand portion of tank 10.

From the foregoing, it will be seen that this invention is one well adapted to attain all the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The apparatus having been described, what is claimed is:

1. Apparatus for separating sludge, oil and the like from contaminated water, comprising:
   (a) a process tank having walls separating the tank into first and second compartments, one of said walls being substantially vertical and having an opening at the lower portion thereof to permit passage of the contaminated water from the first to the second compartment, and another of said walls being mounted in said tank intermediate the upper and lower portions of said tank, being positioned at an incline and being connected to the lower extremity of the first of said separating walls;
   (b) an inlet mounted with said tank for carrying the contaminated water into the first compartment;
   (c) a first outlet mounted with said tank for removing separated oil and the like from the first compartment;
   (d) a second outlet mounted with said tank for removing the treated water from the second compartment;
   (e) a third outlet mounted with said tank for removing separated sludge and the like from the second compartment; and
   (f) a plate pack mounted on the inclined wall in said tank to slope downward from a first to a second end, said pack having
       side walls, a top and a bottom connected to said side walls and forming a conduit for carrying the contaminated water from the first to the second end, said second end being mounted near the opening through said one wall in said tank, and a plurality of corrugated plates mounted one above the other and extending between said side walls to provide a plurality of passageways, said plates being sufficiently displaced from one another to permit laminar flow of the water through the passageways and the corrugations of said plates defining a plurality of upper and lower channels generally parallel with said other of said walls, the water passing from the first to the second compartment by flowing downwardly through the passageways and lower channels, the oil and the like separating from the water during such passage rising and flowing upwardly through said channels and out the first end, the sludge, and the like settling from the water during such passage and flowing out the second end, the ends of the plates disposed in the second end forming a plane which lies substantially vertical and substantially coplanar with said one of said walls when said pack is mounted on said inclined wall for substantially reducing clogging of the passageways during separation of the sludge from the water when flowing through said pack, the uppermost part of said pack being above the level of said inlet.

2. The apparatus as set forth in claim 1, wherein the plane formed by the second end of said pack is within 5° of vertical.

3. The apparatus as set forth in claim 1, wherein the ends of the plates disposed in the first and second ends of said pack form planes which lie substantially parallel to one another, said planes being angled away from the vertical by no more than 5°.

4. The apparatus as set forth in claim 1, including walls mounted in said first compartment to form a first separating compartment, at least a portion of said walls being above the level of said inlet and pack and first outlet and defining an overflow edge, the separated oil and the like flowing over the top of said overflow edge into the first separating compartment for removal through said first outlet; and walls mounted in said second compartment to form a second separating compartment, at least a portion of said walls being above said second outlet and defining a second overflow edge the treated water flowing over said second overflow edge of these walls into the second separating compartment for removal through said second outlet; and wherein said inclined wall is mounted at approximately 45° relative to horizontal, and wherein said plurality of plates are corrugated and the corrugations run from the first toward the second end of said pack.

* * * * *